US011010200B2

(12) United States Patent
Gray et al.

(10) Patent No.: US 11,010,200 B2
(45) Date of Patent: *May 18, 2021

(54) FINITE STATE MACHINE DRIVEN WORKFLOWS

(71) Applicant: Capital One Services, LLC, McLean, VA (US)

(72) Inventors: Rocky Gray, Fairfax, VA (US); Justin Bachorik, Silver Spring, MD (US); Randall Randall, New York, NY (US)

(73) Assignee: Capital One Services, LLC, McLean, VA (US)

(*) Notice: Subject to any disclaimer, the term of this patent is extended or adjusted under 35 U.S.C. 154(b) by 13 days.

This patent is subject to a terminal disclaimer.

(21) Appl. No.: 16/675,582

(22) Filed: Nov. 6, 2019

(65) Prior Publication Data

US 2021/0019192 A1   Jan. 21, 2021

Related U.S. Application Data

(63) Continuation of application No. 16/515,742, filed on Jul. 18, 2019, now Pat. No. 10,474,506.

(51) Int. Cl.
*G06F 9/50* (2006.01)
*G06F 9/451* (2018.01)
*G06F 9/46* (2006.01)
*H04L 29/08* (2006.01)

(52) U.S. Cl.
CPC ............ *G06F 9/5044* (2013.01); *G06F 9/451* (2018.02); *G06F 9/465* (2013.01); *H04L 67/327* (2013.01); *H04L 67/34* (2013.01)

(58) Field of Classification Search
CPC ..................................................... G06F 9/5044
See application file for complete search history.

(56) References Cited

U.S. PATENT DOCUMENTS

| 8,499,148 B2* | 7/2013 | Eng .................... G06Q 10/10 713/155 |
| 10,038,731 B2 | 7/2018 | Pearl et al. |
| 10,110,617 B2 | 10/2018 | Muddu et al. |
| 2011/0137762 A1 | 6/2011 | Pepe et al. |

(Continued)

FOREIGN PATENT DOCUMENTS

WO      2018081833 A1    5/2018

*Primary Examiner* — Charlie Sun
(74) *Attorney, Agent, or Firm* — Sterne, Kessler, Goldstein & Fox P.L.L.C.

(57) ABSTRACT

Disclosed herein are embodiments for providing finite state machine driven workflows. In an embodiment, a workflow template is defined for a type of task. The workflow template may represent a finite state machine. The workflow template may be linked to an external party and an asset type, which may be stored in a workflow database. An asset may be received from the external party including an external party attribute identifying the external party, an asset type attribute, and an owner attribute. The owner attribute may be associated with an application end user. A determination may be made whether the external party attribute and the asset type attribute of the asset match the external party and the asset type linked to the workflow template. If a match is determined, instances of the task and the one or more actions of the workflow template may be created.

20 Claims, 4 Drawing Sheets

(56) References Cited

U.S. PATENT DOCUMENTS

2014/0337532 A1\* 11/2014 Arnette ............ G06Q 10/06311
                                                      709/226
2016/0063595 A1   3/2016 Oral et al.
2018/0032980 A1   2/2018 Rodriguez et al.
2019/0007290 A1   1/2019 He et al.

\* cited by examiner

FINITE STATE MACHINE DRIVEN WORKFLOWS

CROSS-REFERENCE TO RELATED APPLICATIONS

This application is a continuation of a prior nonprovisional U.S. patent application Ser. No. 16/515,742, filed Jul. 18, 2019, titled "FINITE STATE MACHINE DRIVEN WORKFLOWS," which is incorporated herein by reference in its entirety.

BACKGROUND

Numerous platforms act as an intermediary between users and external third parties, for example providing electronic services to users on behalf of a third party organization. Most third parties offer different services having unique needs and workflows, and adapting the platform to integrate the needs of the third party has traditionally been time-consuming and resource intensive. This process typically involves customizing, by the platform developer, application logic and user workflows specific to a particular third party, requiring significant development time that could otherwise be spent on other work. Time and development resources are again required any time a workflow needs to be updated. Additionally, this development often requires customizing the third party's external systems to integrate with the platform, which is typically performed by the platform developer due to integration complexities. Solutions are needed to reduce the time and resources required to integrate third party services and workflows with an intermediary platform.

BRIEF DESCRIPTION OF THE DRAWINGS/FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION OF THE INVENTION

Provided herein are system, apparatus, device, method and/or computer program product embodiments, and/or combinations and sub-combinations thereof, for providing finite state machine driven workflows. Intermediary platforms providing third party services to users typically require significant customization by the platform developer. These platforms may, for example, provide data storage services on behalf of the third party for access by a user, transaction services between the user and the third party, messaging services between the user and the third party, account management services or user/customer support services. However, support for multiple service providers (also referred to as third parties or external parties throughout this disclosure) requires development and customization of these services for each provider.

Traditionally this customization requires custom software development to integrate the service provider's services into the platform. Not only does this require significant time and resources, but these development resources are needed any time service workflow changes, or any time a new service or workflow is added. Embodiments described below address these issues by providing deterministic finite state machine driven workflows for electronic services provided by third parties to end users. Generally speaking, a finite state machine is a computational model that includes a number of states with one state at a time active, which can be used to simulate sequential logic. By encapsulating workflows in a description of a finite state machine, the representation of the finite state machine can drive the user experience. That is, the behavior of the platform and interaction with the end user can be determined based on the states of the active finite state machine, rather than hard-coded logic custom written for each service provider. Generation and execution of these workflows will be discussed in detail below with respect to specific figures.

Figure 1:
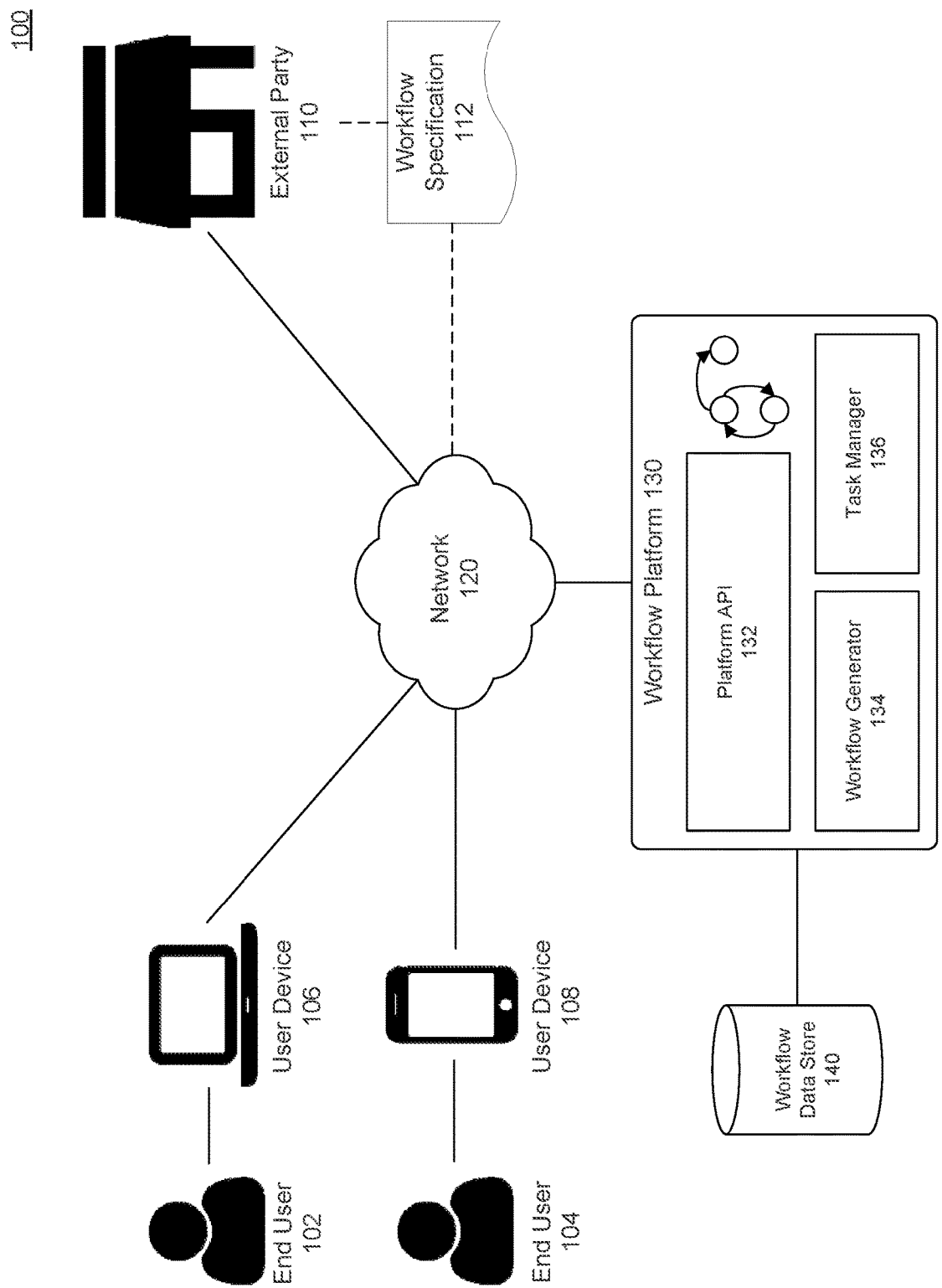
FIG. 1 is a block diagram of an example system providing and managing finite state machine driven workflows, according to some embodiments.

FIG. 1 is a block diagram of an example system 100 providing and managing finite state machine driven workflows, according to some embodiments. In an embodiment, system 100 includes application end users 102 and 104 operating user devices 106 and 108. In some embodiments, end users 102 and 14 may represent human operators, software agents acting on behalf of users, or groups of human operators and/or software agents. User devices 106 and 108 may be any type of computing device, such as and without limitation, a desktop, laptop, or mobile device. System 100 may also include at least one external party 110, which may be a service provider offering services to end users 102 and 104 through workflow platform 130. External party 110 may be coupled to workflow platform 130 via network 120. Network 120 may be any type of network capable of communicating data, such as for example, a wired or wireless local area network or a wide area network (e.g., the Internet), or any combination thereof. User devices 106 may similarly be coupled to workflow platform 130 via network 120.

In an embodiment, external party 110 provides electronic services to application end users 102 and 104 via workflow platform 130. For example, external party 110 might be a landlord or leasing company providing secure execution and storage of leasing contracts, a real estate company providing secure storage of closing documents for house buyers, a service provider offering electronic bill payment, or any other organization or individual providing secure electronic storage, access, and/or transactional services. Each of these services may include a number of workflows that dictate various interactions that enable end users to complete tasks through communication with workflow platform 130.

In an embodiment, workflow platform 130 includes a platform API 132, a workflow generator 134, and a task manager 136. User devices may communicate with workflow platform 130 via platform API 132, discussed in further detail below. In an embodiment, workflow generator 134 may generate workflow templates that represent particular task workflows. Each workflow template may include one task, though there may be multiple tasks and/or subtasks in some embodiments. A task may represent a job to be done.

For example, a task might relate to paying a bill, viewing a document, signing a document, updating account information, etc. Each workflow template may also include one or more actions that represent a request that can be made on behalf of an end user. For example, if a new bill arrives from a service provider, actions available to the end user (in this case the customer) may include paying the bill and marking the bill as already paid. The task may include references to the available actions for that task. The workflow template may further include one or more events that represent a historical record of change applied to the task. Events may be instantiated in response to an action taken by the end user and effect a change to the status of a task. A task may also include subtasks, which may themselves include additional actions and events as part of the workflow template.

According to an embodiment, tasks, actions, and events may be represented as structured data objects. For example, tasks, actions, and events, may be formatted according to various standards such as, but not limited to, JavaScript Object Notation (JSON), Extensible Markup Language (XML), Yet Another Markup Language (YAML), Extensible Hypertext Markup Language (XHTML), or any other appropriate markup or data interchange format. In an embodiment, each task object may include various attributes, such as but not limited to, task identifier, task status, task type, due date, assigned owner identifier (e.g., authorized end user), and references to associated events, actions, and subtasks. The task type may indicate the general shape of a workflow, such as a bill payment task type or a view document task type. The task status may represent the current status of task. Some examples may include, without limitation, pending, awaiting user confirmation, completed, canceled, or failed.

In an embodiment, each action may include various attributes, such as but not limited to, action title, action type, and execution fields. The action type may define the intent of the request, for example, pay bill, mark bill as paid, or dismiss bill. Execution fields may be used to capture input data from the end user, which then act as parameters to the request. These fields may include their own attributes defining, for example, the name of the field, a prompt to the end user, data validation information (e.g., a regular expression for validating input data), a value attribute to hold the input data, and a required flag indicating whether the user needs to input data for this field. In an embodiment, an application end user may submit a request to execute an action in the form of a Hypertext Transfer Protocol (HTTP) request, for example using HTTP GET or POST methods, or using another known data transfer protocol appropriate for use with network 120. To this end, according to an embodiment, each action may include a method attribute (e.g., "POST"), a uniform resource locator (URL) attribute, and a content type attribute that are used to form the HTTP request. In an embodiment, the URL attribute may specify a function or procedure published by platform API 132 that may be called by an end user.

In an embodiment, each event may include various attributes, such as but not limited to, event type, event timestamp indicating the time the event occurred, result status, event description, assigned owner identifier (e.g., authorized end user). The result status attribute may store the associated task's status as a result of the event. Thus, this attribute may be used to update the task status attribute of the task after the event occurs. Events may also include custom attributes specific to a particular event, which can be represented by a name-value pair. For example, if an action to pay a bill is requested by an end user, the event triggered as a result of that action may store a payment processing identifier that identifies the payment.

In an embodiment, workflow platform 130 may be coupled to a workflow database 140. Workflow database may be any type of structured or unstructured data store, such as a relational, document-oriented, or object-oriented database. Each generated workflow template, including the tasks, actions, and events of each workflow template may be stored in workflow database 140. In an embodiment, a workflow template may be linked to a particular task type, rather than particular tasks, which in turn may be associated with one or more tasks referencing one or more actions and events.

As seen from the above embodiments, the structure of workflow templates, including tasks, actions, and events, may be used to represent a deterministic finite state machine (or set of finite state machines) for a particular task. In an embodiment, the task status field of a task may represent the current workflow state within the finite state machine, which can be transitioned based on the result of events triggered in response to actions taken by application end users. The user interaction history can thus be recorded within this general structure representing the finite state machine, and the status and history of the finite state machine can simply be queried from workflow database 140 when needed (e.g., in the case of an error or issue). This drastically reduces debugging time and resources needed to resolve issues, for example when compared to debugging hard-coded software application logic.

In an embodiment, workflow templates may correspond to common tasks that may be shared across multiple external parties 110. For example, document signature tasks may not vary greatly from party to party, and common workflow templates, including tasks, actions, and events, may be generated through workflow generator 134. Certain actions and events may also be shared across workflow templates, and therefore in some embodiments, an action or event may be part of multiple workflow templates. Workflow templates may also be generated with the aid of external party 110. In an embodiment, a workflow specification may be received by workflow platform 130 from external party 110. The workflow specification may define the tasks, actions, and events associated with the workflow, in a format that external party 110 can provide. This format may be the same object notation used to define tasks, actions, and events in workflow database 140 (e.g., JSON), or it may be any appropriate description format that may be converted into the appropriate notation for storage. In an embodiment, this conversion process may be performed by workflow generator 134. This enables external parties to create their own workflows and dynamically inject new behavior into workflow platform 130 without requiring custom development time and resources that might otherwise be required.

According to an embodiment, workflow database 140 may also store information related to assets received and/or stored by workflow platform 130. In some embodiments, the assets themselves may be stored as part of workflow database 140 or may be stored as part of a separate database or system coupled to workflow platform 130. In an embodiment, asset objects stored in workflow database 140 may include various attributes, such as but not limited to, an asset identifier, an asset URL/location (depending on where the asset is stored), an asset type, a customer or user identifier associated with the asset, and an external party from which the asset was received. Workflow templates within workflow database 140 may also be linked to an asset type and an external party (or multiple parties in the case of shared workflow templates). For example, a bill payment workflow template may be linked to one or more service providers and a "bill" asset type.

When a new asset is received at workflow platform 130 by external party 110, workflow database 140 may be queried to determine whether any tasks should be created. In an embodiment, the asset type and external party attributes of the asset may be compared to the asset type and external party (or list of external parties) associated with each workflow template stored in workflow database 140. If a match is found, task manager 136 may create instances of the tasks and actions associated with the matching workflow template. This effectively creates a new finite state machine driven task for an application end user to complete (e.g., paying a bill or signing a document), allowing workflows to be automatically instantiated upon receipt of a particular asset. In an embodiment, since the asset typically includes information regarding the customer or user that the asset is associated with (for example in the case of a bill), owner attributes of created tasks can be automatically based on receipt of the asset.

In an embodiment, an asset may also include custom metadata attributes for use by workflow platform 130, which may be stored in workflow database 140. In an embodiment, task manager 136 may instantiate a particular workflow template (including tasks and actions of the workflow template) based on one or more of these metadata attributes. For example, a leasing contract may include a metadata flag specifying that the document needs signature. Workflow generator 134 may read this flag upon receipt of the leasing contract from external party 110, and task manager 136 may automatically create a task to sign a document, along with the tasks associated actions available to the end user. To enable this functionality, according to an embodiment, the workflow generator 134 may link the workflow template to appropriate asset metadata fields stored in workflow database 140. When the asset is received, task manager 136 may then compare the asset metadata field of the received asset to the asset metadata fields stored in workflow database 140 to determine whether to instantiate a particular workflow.

Once a workflow is instantiated and the relevant tasks and actions have been created, the application end user (owner) associated with each task may take action. In an embodiment, the application end user may submit a request to execute a particular action, such as paying a bill. This request may be received by platform API 132 via network 120. Based on the requested action, platform API 132 may control the interaction with the user to execute the action. If the action requires further input from the user, platform API 132 may generate a user interface for transmission to the end user in which the user may supply the requested input data. For example, in the case of paying a bill, the user interface may enable the user to enter a payment amount and a payment date. These parameters may then become part of the requested action's execution fields, which platform API 132 may use to execute an appropriate procedure within workflow platform 130. In an embodiment, this action execution may trigger creation of an event associated with the workflow, for example a payment submitted event. The result status of the event (e.g., success, pending, failure) may then be used to update the task status, thereby changing the current state of the finite state machine represented by the workflow. API 132 may then generate an appropriate user interface to transmit to the application end user based on the current state of the finite state machine, as indicated by the updated task status.

In an embodiment, platform API 132 may dynamically generate user interfaces, like in the example above, based on the task status of a particular task (i.e., current workflow state of the finite state machine) and/or a requested action by the user. For example, when new workflow templates are created that include actions with new execution fields, these fields may be taken into account by platform API 132 to generate a user interface allowing an application end user to enter the required information. This enables workflow platform 130 to adapt to new workflows with minimal or no human intervention, allowing external parties to inject new behavior into the system without significant time or resource expenditure.

Figure 2:
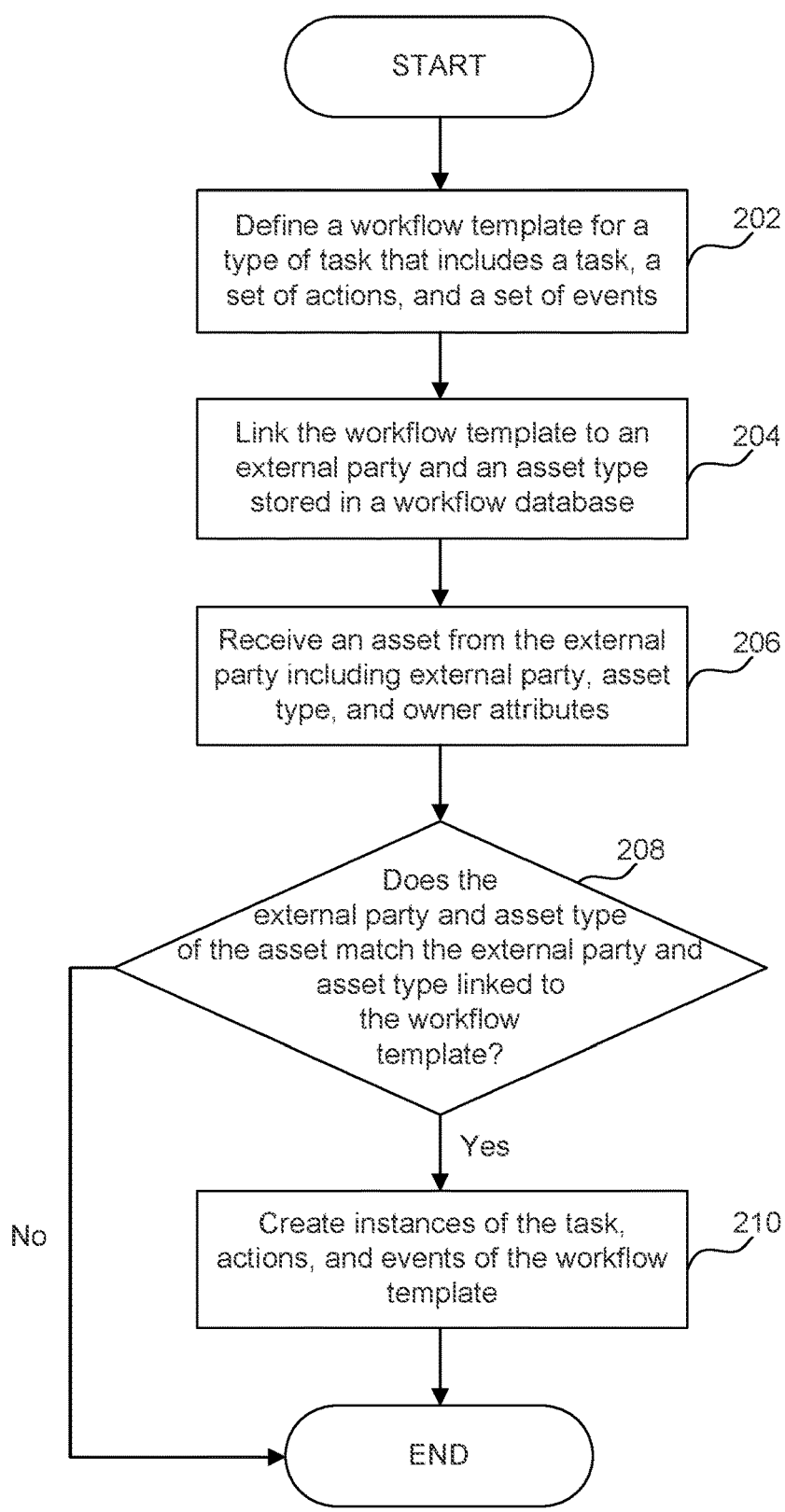
FIG. 2 illustrates an example method for providing finite state machine driven workflows, according to some embodiments.

FIG. 2 illustrates an example method 200 for providing finite state machine driven workflows, according to some embodiments. Method 200 may be performed by processing logic that may comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 2, as will be understood by a person of ordinary skill in the art.

At stage 202, a workflow template for a type of task may be defined and stored in a workflow database. The workflow database may be any type of structured or unstructured data store, such as a relational, document-oriented, or object-oriented database. The workflow template may include a task, a set of actions, and a set of events, as discussed with respect to FIG. 1. In an embodiment, workflow templates may correspond to common tasks that may be shared across multiple external parties. Certain actions and events may also be shared across workflow templates, and therefore in some embodiments, an action or event may be part of multiple workflow templates. Workflow templates may also be generated with the aid of an external party. In an embodiment, a workflow specification may be received from the external party. The workflow specification may define the tasks, actions, and events associated with the workflow, in a format that the external party can provide. This format may be the same object notation used to define tasks, actions, and events within the workflow database (e.g., JSON), or it may be any appropriate description format that may be converted into the appropriate notation for storage.

At stage 204, the workflow template may be linked to an external party and an asset type stored in the workflow database. For example, a bill payment workflow template may be linked to one or more service providers and a "bill" asset type.

At stage 206, an asset may be received from the external party. The asset may include an external party attribute, an asset type attribute, and an owner attribute, among others. Some examples of asset types may include, without limitation, a bill or invoice, a leasing contract or other agreement, an informational disclosure, a viewable image, an executable file, or any other logical categorization of the asset. The asset type may also include, additionally or alternatively, a file type, such as and without limitation, a WORD document, a PDF document, an EXCEL document, a JPEG or PNG file, a binary file, a source code file, or any other electronic file type.

At stage 208, a determination may be made whether the external party and asset type attributes of the asset match the external party and asset type linked to the workflow template. In an embodiment, this determination may involve performing a comparison of the external party and asset type attributes of the asset to the external party and asset type linked to the workflow template. If no match is determined at stage 208, the process ends. On the other hand, if a match is determined at stage 208, the process proceeds to stage 210. In an embodiment, stage 208 may be performed automatically upon receipt of the asset.

At stage 210, instances of the task and actions of the workflow template may be created. Once the task and action instances of the workflow have been created, the application end user may have the ability to complete the task through execution of available actions, as discussed in more detail with respect to method 300 of FIG. 3.

Figure 3:
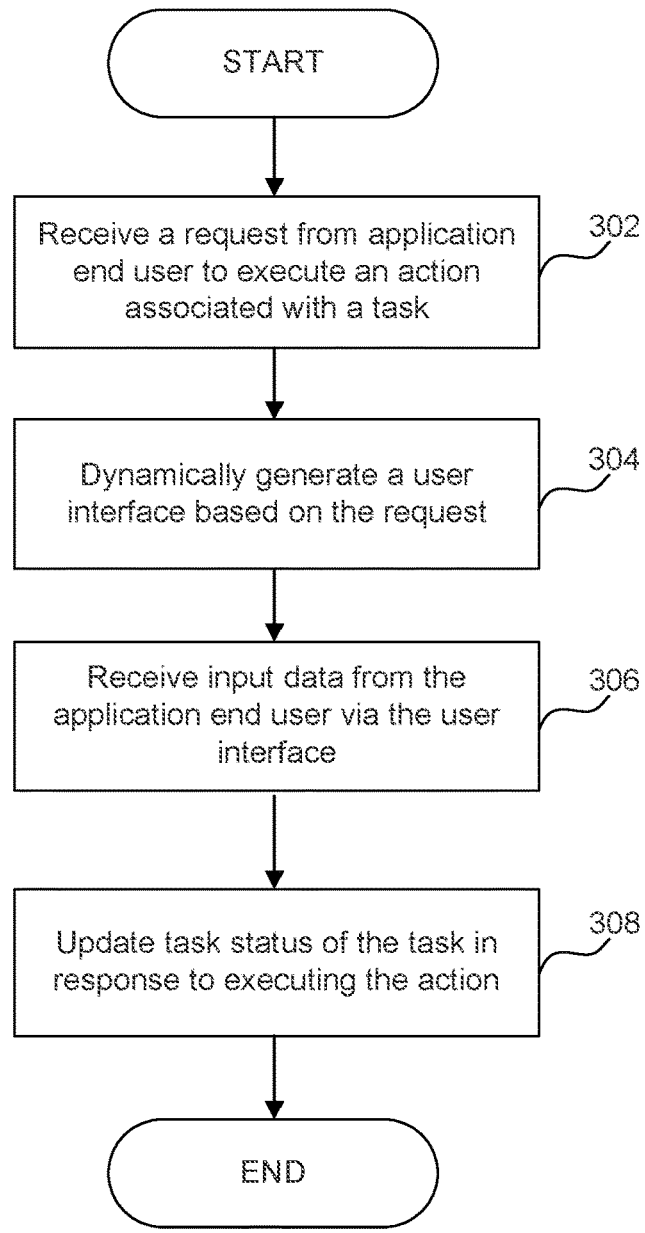
FIG. 3 illustrates an example method for executing finite state machine driven workflows, according to some embodiments.

FIG. 3 illustrates an example method 300 for executing finite state machine driven workflows, according to some embodiments. Method 300 may be performed by processing logic that may comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art.

At stage 302, a request may be received from an application end user, such as application end user 102 or 104 of FIG. 1, to execute an action associated with a task. This may occur, for example, after an asset has been received and new task and action instances have been created, as described in steps 206 through 210 of method 200. In an embodiment, the request may be received by through an API, such as platform API 132 of FIG. 1. At stage 304, a user interface may be dynamically generated based on the request received from the application end user. For example, in the case of paying a bill, the user interface may enable the user to enter a payment amount and a payment date.

At stage 306, input data may be received from the application end user via the user interface. As in the above example, a user may enter a payment amount and payment date, which may then become part of the requested action's execution fields, as discussed with respect to FIG. 1. In an embodiment, when the action is executed, creation of an event associated with the workflow may be triggered, for example a payment submitted event.

Finally, at stage 308, the task status of the task may be updated in response to executing the action. In the case that an event is created in response to the action execution, the result status of the event (e.g., success, pending, failure) may be used to update the task status. This updating effectively changes current state of the finite state machine underlying the workflow template.

Figure 4:
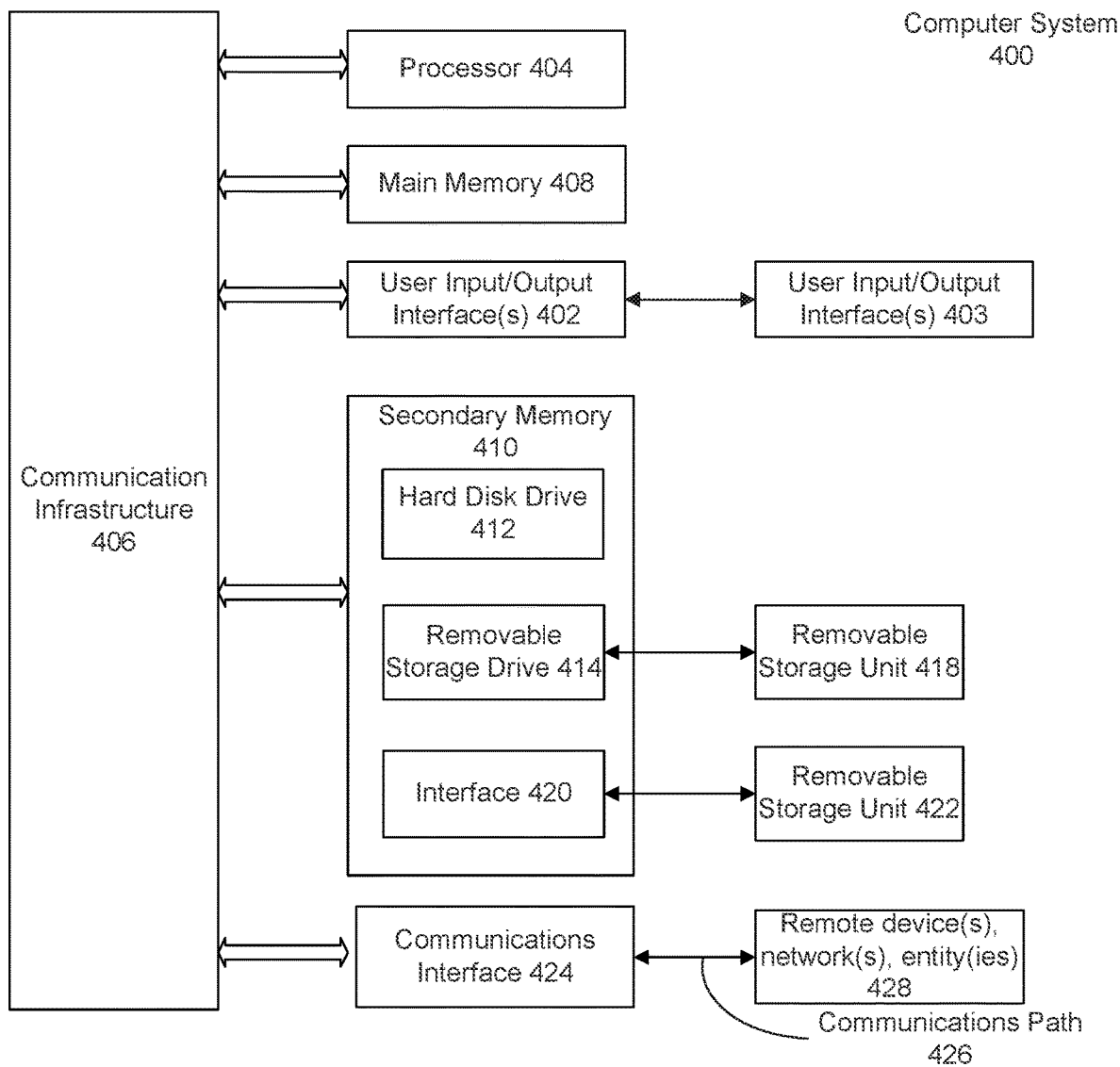
FIG. 4 illustrates an example computer system useful for implementing various embodiments.

FIG. 4 illustrates an example computer system useful for implementing various embodiments. Various embodiments may be implemented, for example, using one or more well-known computer systems, such as computer system 400 shown in FIG. 4. One or more computer systems 400 may be used, for example, to implement any of the embodiments discussed herein, as well as combinations and sub-combinations thereof.

Computer system 400 may include one or more processors (also called central processing units, or CPUs), such as a processor 404. Processor 404 may be connected to a communication infrastructure or bus 406.

Computer system 400 may also include user input/output device(s) 403, such as monitors, keyboards, pointing devices, etc., which may communicate with communication infrastructure 406 through user input/output interface(s) 402.

One or more of processors 404 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 may also include a main or primary memory 408, such as random access memory (RAM). Main memory 408 may include one or more levels of cache. Main memory 408 may have stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 may include a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 may read from and/or write to removable storage unit 418.

Secondary memory 410 may include other means, devices, components, instrumentalities or other approaches for allowing computer programs and/or other instructions and/or data to be accessed by computer system 400. Such means, devices, components, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 may enable computer system 400 to communicate and interact with any combination of external devices, external networks, external entities, etc. (individually and collectively referenced by reference number 428). For example, communication interface 424 may allow computer system 400 to communicate with external or remote devices 428 over communications path 426, which may be wired and/or wireless (or a combination thereof), and which may include any combination of LANs, WANs, the Internet, etc. Control logic and/or data may be transmitted to and from computer system 400 via communication path 426.

Computer system 400 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 400 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, the Examiner is also reminded that any disclaimer made in the instant application should not be read into or against the parent application.

What is claimed is:

1. A system, comprising:
a memory; and
at least one processor coupled to the memory and configured to perform operations comprising:
defining a workflow template for a type of task, the workflow template representing a finite state machine;
linking the workflow template to an external party and an asset metadata attribute stored in a workflow database;
receiving an asset from the external party, the asset including an external party attribute, an asset metadata attribute, and an owner attribute, wherein the owner attribute is associated with an application end user;
determining whether the external party attribute and the asset metadata attribute of the asset match the stored external party and the stored asset metadata attribute linked to the workflow template; and
instantiating the workflow template when the external party attribute and the asset metadata attribute of the asset match the stored external party and the stored asset metadata attribute of the workflow template.

2. The system of claim 1, wherein the workflow template includes a task, one or more actions, and one or more events, and wherein the instantiating further comprises:
creating instances of the task and the one or more actions of the workflow template, wherein the task instance includes a task status indicating a current workflow state of the finite state machine, and wherein the one or more action instances enable interaction between the application end user and the task instance.

3. The system of claim 1, wherein each of the asset metadata attribute of the asset and the stored asset metadata attribute linked to the workflow template is a custom metadata attribute specified by the external party.

4. The system of claim 1, wherein each of the asset metadata attribute of the asset and the stored asset metadata attribute linked to the workflow template is an asset type.

5. The system of claim 1, the operations further comprising:
receiving a request from the application end user to execute an action instance of the one or more action instances;
dynamically generating a user interface for transmission to the application end user based on the request to execute the action instance;

receiving input data specified by the action instance from the application end user via the user interface; and updating the task status of the task instance in response to executing the action instance.

6. The system of claim 1, wherein each of the one or more events represents a record of a change applied to the task,
wherein each of the one or more actions represents a procedure callable by an application end user, and
wherein the task includes a task type and references to the one or more actions and the one or more events.

7. The system of claim 1, the operations further comprising receiving a workflow specification from the external party, wherein the workflow template is defined based on the received workflow specification.

8. A computer-implemented method, comprising:
defining a workflow template for a type of task, the workflow template representing a finite state machine;
linking the workflow template to an external party and an asset metadata attribute stored in a workflow database;
receiving an asset from the external party, the asset including an external party attribute, an asset metadata attribute, and an owner attribute, wherein the owner attribute is associated with an application end user;
determining whether the external party attribute and the asset metadata attribute of the asset match the stored external party and the stored asset metadata attribute linked to the workflow template; and
instantiating the workflow template when determining that the external party attribute and the asset metadata attribute of the asset match the stored external party and the stored asset metadata attribute of the workflow template.

9. The method of claim 8, wherein the workflow template includes a task, one or more actions, and one or more events, and wherein the instantiating further comprises:
creating instances of the task and the one or more actions of the workflow template, wherein the task instance includes a task status indicating a current workflow state of the finite state machine, and wherein the one or more action instances enable interaction between the application end user and the task instance.

10. The method of claim 8, wherein each of the asset metadata attribute of the asset and the stored asset metadata attribute linked to the workflow template is a custom metadata attribute specified by the external party.

11. The method of claim 8, wherein each of the asset metadata attribute of the asset and the stored asset metadata attribute linked to the workflow template is an asset type.

12. The method of claim 8, further comprising:
receiving a request from the application end user to execute an action instance of the one or more action instances;
dynamically generating a user interface for transmission to the application end user based on the request to execute the action instance;
receiving input data specified by the action instance from the application end user via the user interface; and
updating the task status of the task instance in response to executing the action instance.

13. The method of claim 8, wherein each of the one or more events represents a record of a change applied to the task,
wherein each of the one or more actions represents a procedure callable by an application end user, and
wherein the task includes a task type and references to the one or more actions and the one or more events.

14. The method of claim 8, further comprising receiving a workflow specification from the external party, wherein the workflow template is defined based on the received workflow specification.

15. A non-transitory computer-readable storage device having instructions stored thereon that, when executed by at least one computing device, cause the at least one computing device to perform operations comprising:
defining a workflow template for a type of task, the workflow template representing a finite state machine;
linking the workflow template to an external party and an asset metadata attribute stored in a workflow database;
receiving an asset from the external party, the asset including an external party attribute, an asset metadata attribute, and an owner attribute, wherein the owner attribute is associated with an application end user;
determining whether the external party attribute and the asset metadata attribute of the asset match the stored external party and the stored asset metadata attribute linked to the workflow template; and
instantiating the workflow template when determining that the external party attribute and the asset metadata attribute of the asset match the stored external party and the stored asset metadata attribute of the workflow template.

16. The non-transitory computer-readable storage device of claim 15, wherein the workflow template includes a task, one or more actions, and one or more events, and wherein to perform the instantiating, the operations further comprise:
creating instances of the task and the one or more actions of the workflow template, wherein the task instance includes a task status indicating a current workflow state of the finite state machine, and wherein the one or more action instances enable interaction between the application end user and the task instance.

17. The non-transitory computer-readable storage device of claim 15, wherein each of the asset metadata attribute of the asset and the stored asset metadata attribute linked to the workflow template is a custom metadata attribute specified by the external party.

18. The non-transitory computer-readable storage device of claim 15, wherein each of the asset metadata attribute of the asset and the stored asset metadata attribute linked to the workflow template is an asset type.

19. The non-transitory computer-readable storage device of claim 15, the operations further comprising:
receiving a request from the application end user to execute an action instance of the one or more action instances;
dynamically generating a user interface for transmission to the application end user based on the request to execute the action instance;
receiving input data specified by the action instance from the application end user via the user interface; and
updating the task status of the task instance in response to executing the action instance.

20. The non-transitory computer-readable storage device of claim 15, wherein each of the one or more events represents a record of a change applied to the task,
wherein each of the one or more actions represents a procedure callable by an application end user, and
wherein the task includes a task type and references to the one or more actions and the one or more events.

* * * * *